No. 652,319. Patented June 26, 1900.
F. A. LINGER & J. A. CARLISLE.
TIME MEDICINE CABINET.
(Application filed Mar. 13, 1900.)
(No Model.) 5 Sheets—Sheet 1.

Witnesses
Geo. E. Frech.
H. A. Campbell

Inventors
Frederick A. Linger
and
Joseph A. Carlisle
by
S. H. Evans
Attorney

THE NORRIS PETERS CO., PHOTO-LITHO., WASHINGTON, D. C.

No. 652,319. Patented June 26, 1900.
F. A. LINGER & J. A. CARLISLE.
TIME MEDICINE CABINET.
(Application filed Mar. 13, 1900.)
(No Model.) 5 Sheets—Sheet 2.
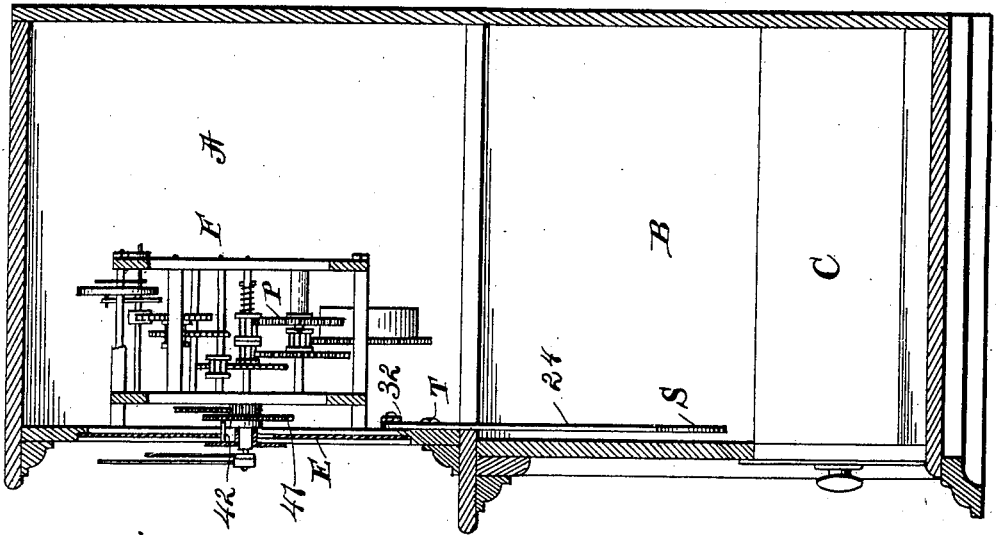
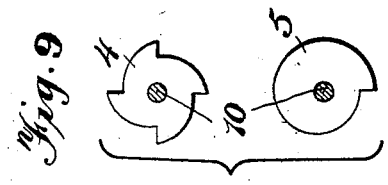
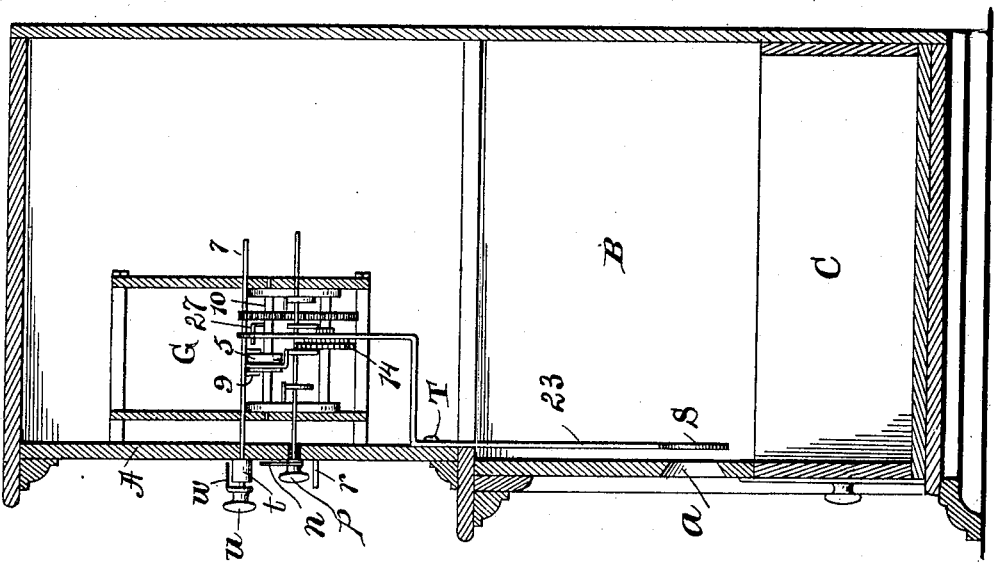
Witnesses
Geo. E. Buch.
H. A. Campbell.
Inventors
Frederick A. Linger
Joseph A. Carlisle
by
J. H. Evans Attorney No. 652,319. Patented June 26, 1900.
F. A. LINGER & J. A. CARLISLE.
TIME MEDICINE CABINET.
(Application filed Mar. 13, 1900.)
(No Model.) 5 Sheets—Sheet 3.

No. 652,319. Patented June 26, 1900.
F. A. LINGER & J. A. CARLISLE.
TIME MEDICINE CABINET.
(Application filed Mar. 13, 1900.)
(No Model.) 5 Sheets—Sheet 4.
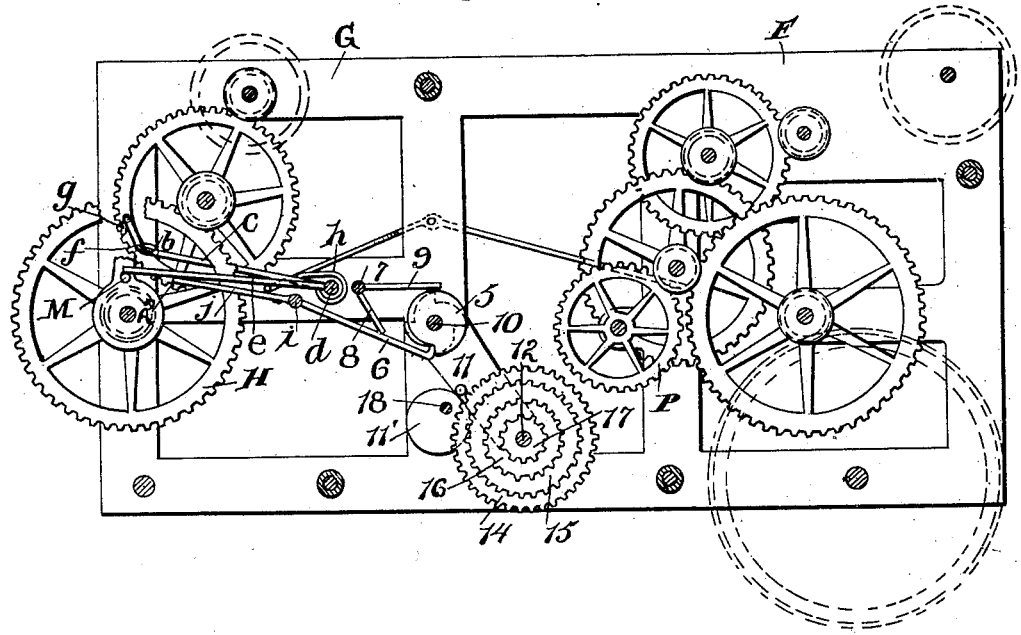

No. 652,319. Patented June 26, 1900.
F. A. LINGER & J. A. CARLISLE.
TIME MEDICINE CABINET.
(Application filed Mar. 13, 1900.)
(No Model.) 5 Sheets—Sheet 5.
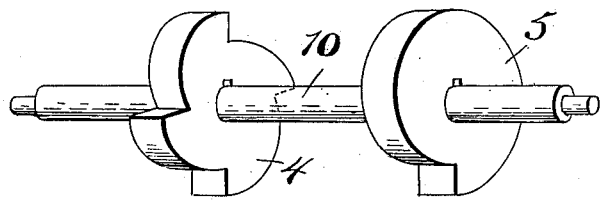
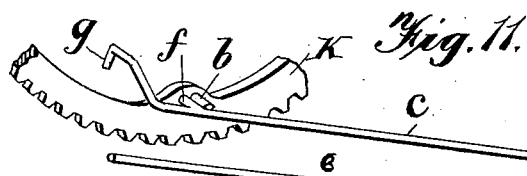
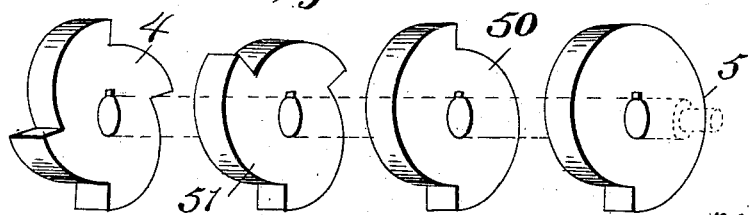
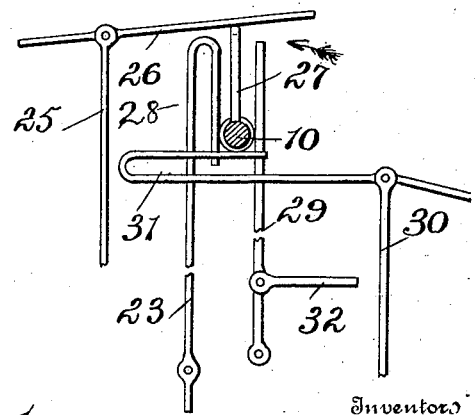
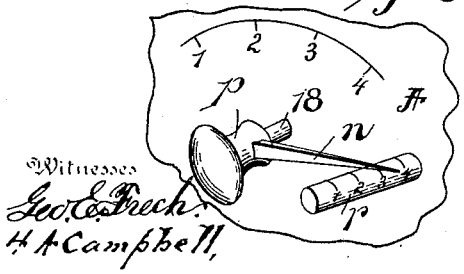

UNITED STATES PATENT OFFICE.

FREDERICK A. LINGER AND JOSEPH A. CARLISLE, OF WASHINGTON, DISTRICT OF COLUMBIA.

TIME MEDICINE-CABINET.

SPECIFICATION forming part of Letters Patent No. 652,319, dated June 26, 1900.

Application filed March 13, 1900. Serial No. 8,542. (No model.)

*To all whom it may concern:*

Be it known that we, FREDERICK A. LINGER and JOSEPH A. CARLISLE, citizens of the United States, residing at Washington, in the District of Columbia, have invented certain new and useful Improvements in Medicine-Cabinets, of which the following is a specification.

Our invention relates to improvements in medicine-cabinets, and pertains to a cabinet containing a timing and an alarm mechanism so constructed and arranged, in conjunction with one or more drawers, chambers, or receptacles for receiving the medicine to be taken, that the alarm mechanism is adapted to be set for alarming at predetermined periods and an indicating mechanism adapted to indicate the particular medicine that is to be taken when the alarm is sounded, all of which will be fully described hereinafter and particularly pointed out in the claims.

Figure 1:
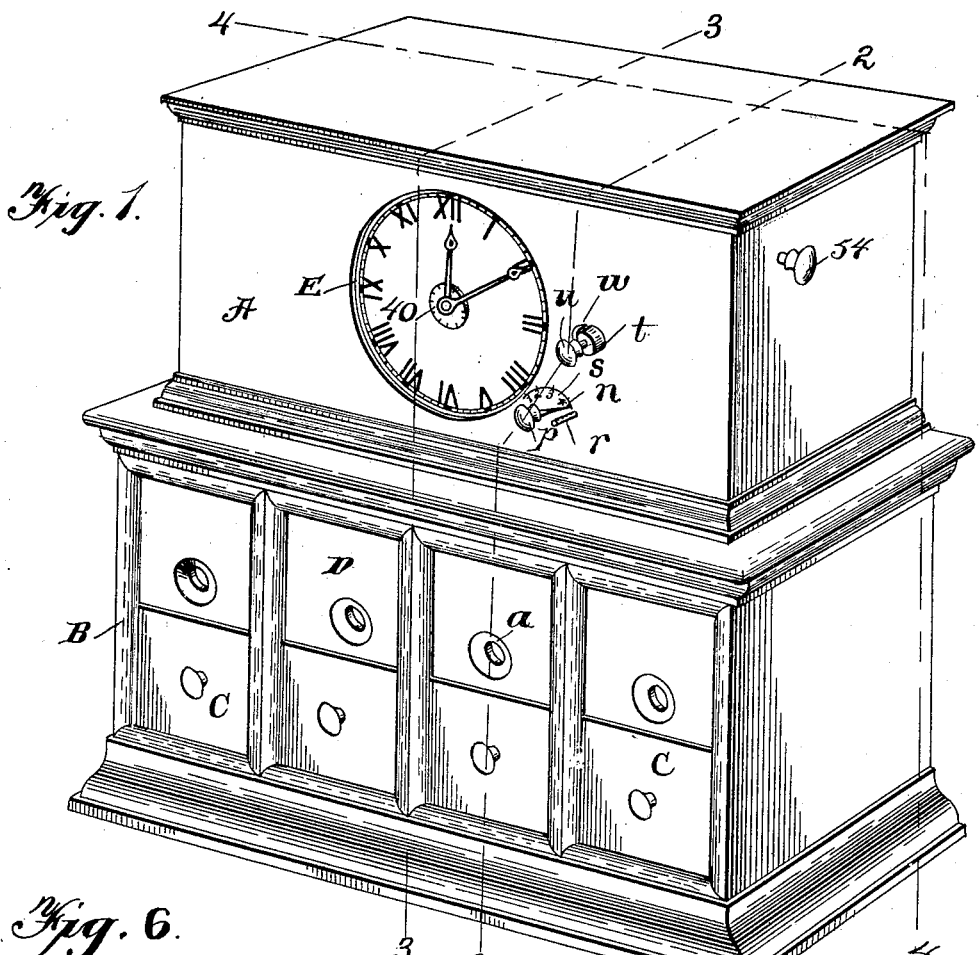
Figure 6:
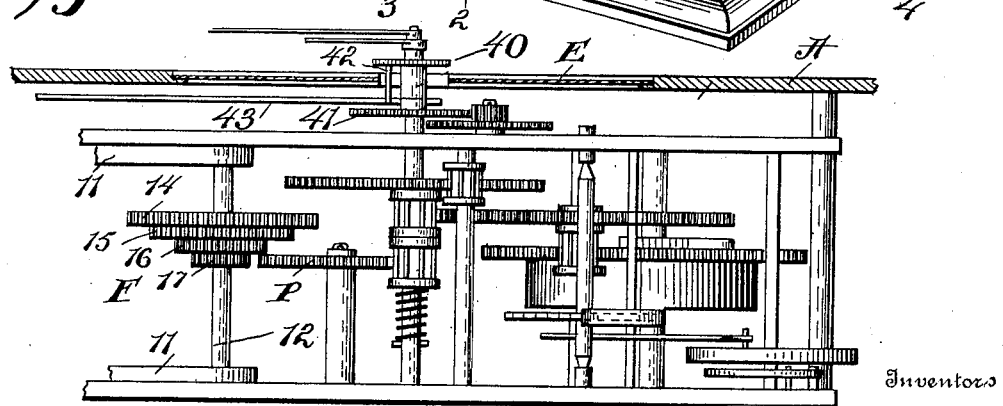
Figure 4:
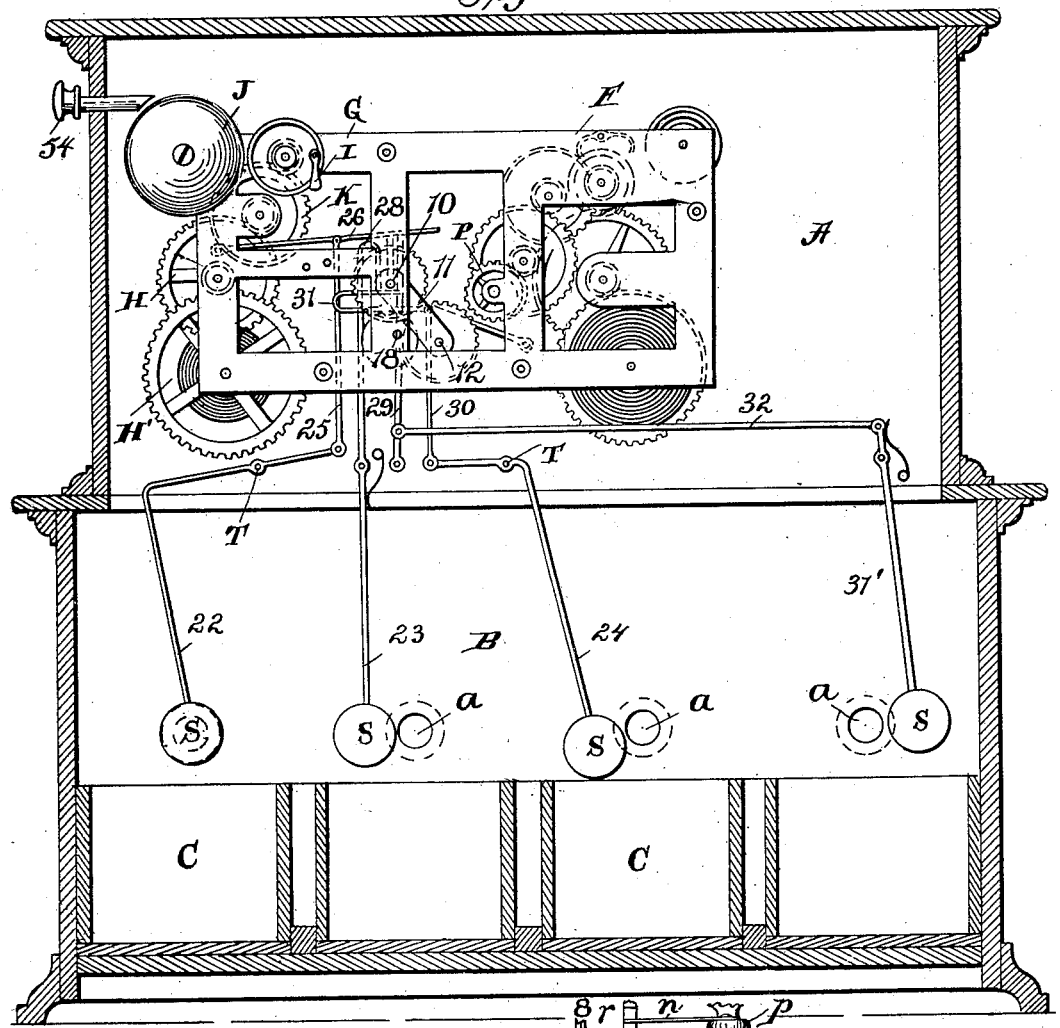
Figure 5:
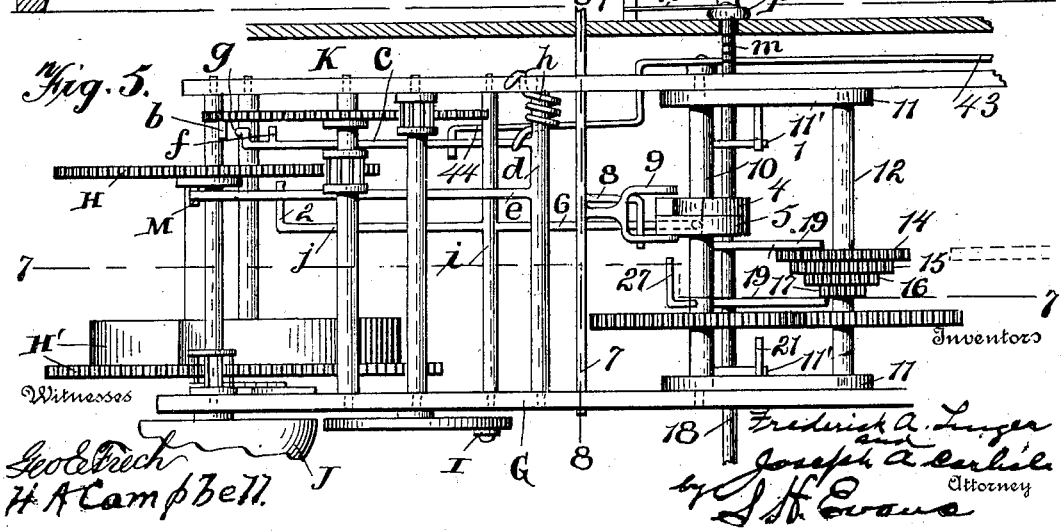

Referring now to the drawings, Figure 1 is a perspective view of a cabinet which embodies our invention. Fig. 2 is a vertical sectional view on the dotted line 2 2 of Fig. 1. Fig. 3 is a vertical sectional view on the line 3 3 of Fig. 1. Fig. 4 is a vertical sectional view at right angles to Figs. 2 and 3 and on the line 4 4 of Fig. 1. Fig. 5 is a top plan view of the combined alarm and indicating mechanism, the indicating-arms and their connections being omitted. Fig. 6 is a top plan view of the time mechanism and the cooperating element of the alarm and indicator mechanism. Fig. 7 is a vertical sectional view on the line 7 7 of Fig. 5. Fig. 8 is a transverse vertical sectional view at right angles to Fig. 7 and taken on the line 8 8 of Fig. 5. Fig. 9 indicates the two forms of alarm-controlling cams which are used in the alarm mechanism. Fig. 10 is a detached perspective view of shaft 10, illustrating the cams carried thereby. Fig. 11 is a detached view of the escape-lever *c* of the alarm mechanism.
Fig. 12 is a detached separate view of the catch for holding the hour-setting shaft at the desired point. Fig. 13 is an enlarged detail view of the indicator for the sliding hour-adjusting shaft or bar. Fig. 14 is a large view of shaft 10 and showing the relative positions in respect thereto of the indicator-operating levers. Fig. 15 is a detached perspective view of the shaft 10, showing a modification in respect to the use of four cam-wheels instead of two, as shown in Fig. 5.

It is a well-known fact to physicians and others who have had experience in the taking of medicine or of giving medicine to the sick that it is seldom taken regularly and at the prescribed time, for the reason that the time for taking the medicine escapes from the memory of those having charge thereof, which greatly diminishes the effectiveness of the physician's prescription. For the purpose of avoiding this overlooking of the taking of medicine at the particular prescribed time is the object of our present invention. We accomplish this end by providing a case or cabinet which is provided with an upper portion A and a lower portion B. The lower portion B is provided with a plurality of drawers C, one or as many more as may be desired, according to necessity, in which the medicine or medicines are placed to be taken by the patient.

Situated in the upper portion A of the cabinet or case is a time mechanism F and a combined alarm and indicator mechanism G, which will be fully described hereinafter. Our alarm and indicating mechanism is so constructed and arranged that it can be set to alarm every one, two, three, or four hours or fraction thereof, as desired, and can also be set so that when the alarm sounds the indicator will indicate the particular medicine that is to be taken by exhibiting an indicator or sign at that drawer, chamber, or receptacle which contains the medicine to be taken, and the alarm and indicating mechanism is so arranged and constructed that the indicators for the several receptacles or drawers will indicate consecutively, so that where there are several medicines to be taken consecutively the indicators will so indicate, and the mechanism is also so constructed that it will "repeat" the indication at the same drawer or receptacle for taking a single medicine repeatedly at each alarm given by the alarm mechanism. Bearing in mind these objects of our invention, we will now describe the several constructions and the operation thereof whereby these ends are accomplished.

Referring now to the time mechanism, it is sufficient to say that this will be of any ordinary form. The alarm and indicator mechanism G by reference to Fig. 4 it will be seen is inclosed within the same frame as the time mechanism F, though, if desired, it will be readily understood that separate frames may be provided for the separate mechanisms and the frames afterward so relatively supported that the two mechanisms will coöperate, as hereinafter explained.

The alarm mechanism consists of a train of gear H, one of which is provided with a knocker or hammer I for engaging the bell J and sounding the alarm when the alarm-train is released through the mechanism which we will now explain. A spring H' serves to set in motion the alarm mechanism in the usual way, and it is necessary to provide a stopping and releasing mechanism which is controlled by the time mechanism, whereby the alarm mechanism will be released at a predetermined period of time and to give a short alarm and to be automatically stopped again and held quiet until the next period of time for taking the next medicine is reached, when it will again release the alarm mechanism, and in this way the releasing and the stopping of the mechanism is repeated when each period of time at which the alarm is to be given is reached. The wheel K of the alarm train of gearing is provided with a projecting pin $b$, adapted to be engaged and stopped by the vibrating escape-lever $c$, which projects laterally from a rocking shaft $d$. The outer free end of this escape-lever $c$ is provided with two projecting shoulders $f$ and $g$, the former being situated at a point in rear of the latter and the latter situated or extending to a point above the projection $f$. When the shaft $d$ is lifted, the pin $b$ will escape from the projection $f$ and be immediately caught by the depending projection $g$ and will be held in this position until it is released in a manner which will be presently described. A spring $h$, surrounding the shaft $d$, serves to hold the shaft normally downward, and the shaft $d$ is provided with a second laterally-projecting arm $e$, which is engaged by a pin M, projecting from the wheel H of the alarm-train or from the shaft of the said wheel, and by engagement with the free end of the arm $e$ as the gear rotates serves to lift the arm $e$ and in turn to lift the escape-arm $c$. An oscillating shaft $i$ is provided with a projecting arm $j$, having an inwardly-extending arm 2 extending under the free end of the arm $e$ and adapted to engage the same for supporting the arm, and, consequently, in turn holding the shaft $d$ against oscillation through the medium of another projecting arm 6 from the said shaft $i$, the outer end of the said projecting shaft 6 having its end adapted to engage the cams upon one or the other of the cam-wheels 4 and 5, situated upon the shaft 10. When the free end of the arm 6, however, is released by falling off the end of one of the cams of these wheels 4 and 5, then the spring tension of the spring $h$ will oscillate the shaft $d$ and force the escape-arm $c$ downward for releasing the stop-pin $b$, and thus releasing the alarm mechanism. The alarm mechanism will then continue to operate until the wheel or gear H has made one revolution and caused the pin M to engage the under side of the free arm $e$ and lift it up and in turn through the medium of the shaft $d$ lift the free end of the shaft $c$ and bring its pin $f$ in line with the pin $b$ of the gear K, and thus stop the alarm mechanism, where it is again held until released in the manner just described. From this description it will be seen that as the shaft 10 rotates the alarm will be sounded each time the free end of the arm 6 is released by dropping off one of the cams of either of the wheels 4 or 5, according to which one it is in engagement with. These cam-wheels 4 and 5 have a sliding movement upon the shaft 10 for the purpose of bringing either of them in line with the free end of the arm 6 to be engaged thereby, and the wheel 4 has four cams, while the wheel 5 has one cam, for a purpose to be hereinafter explained. Through the medium of a sliding rod 7, having at its outer end a knob or handle $u$, the said shaft can be moved endwise, and through the medium of the yoke 9, engaging opposite sides of the wheels 4 and 5, the said wheels can be moved upon the shaft 10, but are locked against independent rotation in respect to the said shaft 10 through the medium of an ordinary feather or spline, which is well understood by mechanics. For the purpose of enabling the operator to know which of the wheels 4 or 5 is in position to operate the alarm mechanism we provide the knob or handle $u$ with a pointer $w$ and the outer side of the case with a projecting indicator $t$, having two notches, and one of these notches may have written adjacent thereto the word "Repeat" and the other the word "Consecutively," which would indicate to the operator that when the pointer is placed at one notch the mechanism will sound an alarm repeatedly and indicate repeatedly the same medicine in the same drawer or receptacle, while when the pointer is at the other notch, "Consecutively," the operator will understand that the machine will alarm and indicate the several receptacles consecutively.

The means by which the alarm and indicator mechanism is adapted to be set for sounding an alarm and making an indication at every hour or every two or three hours or every four hours consists of a gear comprising a plurality of gears 14, 15, 16, and 17, which are of different sizes and are adapted to be thrown in operative connection with the wheel P of the time mechanism, and the gears will be of such size that a complete rotation will be given the shaft 12 at the respective periods of one, two, three, and four hours, according to which of the gears 14, 15, 16, and 17 are in engagement or mesh with the wheel P of the time mechanism. For the purpose of enabling the respective gears to be brought into mesh or operation with the gear of the time mechanism the said gears are slidable upon the shaft 12 and independent thereof, but which will be locked against independent rotation in respect thereto by means of a feather, which is well understood by mechanics and need not be specifically described. The means for moving this wheel upon the shaft 12 consists of a rod 18, having projecting therefrom the arms 19, engaging, respectively, the opposite sides of the said gears, whereby when the rod 18 is moved endwise the gear is correspondingly moved. For the purpose of enabling the operator to move the gears the proper distance to bring the respective ones into their operative position we provide a projecting indicator $r$, having thereon a plurality of notches corresponding to the said gears, and these notches may have the figures "1," "2," "3," and "4," thus indicating to the user the period of time represented by the respective notches.

The means whereby the respective gears are thrown into and out of operative connection with the gear P of the time mechanism consists of the pivoted arms 11, which have their upper ends journaled upon the shaft 10, and in their lower ends the shaft 12 is journaled, the said shaft 12 and the arms 11 constituting, essentially, a U-shaped pivoted frame. This frame is adapted to be raised for the purpose of bringing the respective gears into operative connection with the time mechanism and also adapted to be released, so that it will drop out of operative connection therewith. The means for effecting this consists in providing the shaft or rod 18 with the cams 11', adapted to engage inwardly-projecting studs or pins 21, extending from the sides of the said frame. When the shaft 18 is oscillated in one direction, the cams will lift the frame and when oscillated in the opposite direction will permit the frame to drop. For the purpose of indicating to the user when the shaft 18 has been turned the proper distance to bring the respective gears into operative connection with the time mechanism we provide the end of the shaft 18 with a handle or knob $p$, which is provided with a pointer $n$, adapted to coöperate with the indicator $r$. The said indicator is provided, as before stated, with a plurality of notches. For the purpose of also indicating and assisting the operator in adjusting the shaft the shaft is provided with four circumferential grooves $m$, the proper distance apart to correspond with the gears 14 to 17, inclusive, and adapted to engage with these grooves, respectively, is a spring-detent $q$, which, as will be readily understood, will assist the operator in properly adjusting the shaft to the desired gear for indicating the desired period that the mechanism is to alarm. From this description it will be seen that the shaft 18 performs a double function, one function being the adjustment of the gears 14 to 17 and the other being the movement of the gear-frame to proper position to properly engage and coöperate with the time mechanism without producing any wedging action which would tend to interfere with the time mechanism in any manner whatever.

Having thus far described the mechanism and means whereby our alarm is sounded at a predetermined period, we will now explain the means by which an indication is given to the user which medicine is to be taken.

As before stated, the lower portion of the cabinet will be provided with one or more drawers C, or instead of the drawers simple receptacles or chambers may be provided and adapted to receive any form of medicine. Just above each of these drawers or receptacles are the openings $a$, through which the indicators are adapted to be seen when they are placed thereat. The levers 22, 23, 24, and 31' have at their lower ends the indicators S, which may have simply plain faces or have written thereon the word "Take," and these levers are intermediately pivoted, respectively, at the points T. The lever 22 has connected to its upper end a link 25, the opposite end of the link 25 being intermediately pivoted to a lever 26, the free end of the lever projecting over the shaft 10, which is provided with an operating projection 27, adapted to engage the free end of the lever 26 and to lift and to thereby throw its signal S across and in front of its respective opening $a$, and thus indicating to the user that the medicine contained in that drawer or receptacle is to be taken when the alarm is sounded. The operating projection or wire 27 is situated about at the end of the cams upon the wheels 4 and 5, and there will be one arm or projection 27 which is adapted to operate the signals in rotation, as will be now further explained. In Fig. 14 the projection or wire 27 is shown in the position for holding the signal of the lever 26 across an opening $a$, and as the shaft 10 revolves in the direction indicated in Fig. 14 it will be seen that the projection will next be carried in contact with the upper U-shaped end 28 of the lever 23, and hence after the lever 26 and its respective signal are removed from the opening $a$ the next succeeding signal carried by the arm or lever 23 will be carried across its respective opening when the next alarm is sounded. As the shaft 10 begins to revolve the projection or wire 27 will then be carried in engagement with the upper end 31 of the intermediately-pivoted lever, which has connected with its opposite end a vertically-arranged link 30, which is in turn connected with the upper end of the lever 24, and thus operating or carrying its signal in succession across the next opening $a$. The continued rotation of the shaft 10 next carries the projection or wire 27 in engagement with the vertically-arranged lever 29, which is pivoted at its lower end and has connected therewith the link 32, the opposite or outer end of the link being connected with the upper end of the signal-lever 31', and in turn operate or carry its signal across the fourth opening $a$. From this description it will be seen that as the alarms are sounded by the four cams upon the shaft 10 the signals are carried across their respective openings successively or consecutively, thus indicating to the user which medicine is to be taken. The period of time between these alarms and signals is regulated, as before fully explained, according to which of the gears 14 to 17, inclusive, are in operative engagement with the time mechanism.

For the purpose of enabling us to "repeat" or to give a signal repeatedly at the same drawer, box, or receptacle when the alarm is sounded we move the gears 4 and 5, which slide upon the shaft 10, as before explained, so that the gear 5, which has but one cam, is in a line with the free end of the bar 6, as before explained and as shown in Fig. 5. When in this position, it will be seen that there will be but one alarm for each rotation of the shaft 10, and while each of the signals will be operated successively, as before described, there will be no alarm to call the attention of the user to the taking of the medicine until the shaft 10 has made a complete revolution and brought into operation the first signal carried by the arm 22. From this description it will be understood that while there is no means to throw out of operation the several signals as the shaft 10 revolves, yet we have provided means to prevent the sounding of an alarm as the signals are being operated consecutively, whereby an alarm will only be sounded when the particular signal carried by the arm 22 is across its opening $a$. In this way the signal and the alarm will be repeated at the same box or receptacle, as will be readily understood.

The means for moving the gears 4 and 5 have been before explained, whereby the operator is enabled to determine which of the said gears is in the operative position.

Attention is now directed to the outer side of the cabinet adjacent to the operating-handle $p$ of the shaft or rod 18. It will be seen that in addition to the indicating projection $r$ there is a dial having the numbers of from "1" to "4," inclusive, which will indicate to the user when the pivoted frame 11' has been elevated sufficiently to carry the respective gears 14 to 17, inclusive, in their operative position. Attention is also directed to the fact that the indicator or pin $r$ is situated at a point beyond the numeral "4," whereby the pointer $n$ may be carried in engagement therewith, and thus carry the gear 14 out of engagement with a gear P of the time mechanism. This arrangement has two purposes, one being to carry the gear entirely out of engagement with the time mechanism, whereby the gears can be moved upon the shaft 12 into proper position to engage with the gear of the time mechanism, which would be difficult to accomplish if the gears were simply moved sidewise for that purpose, as will be readily understood. The second function of this is to enable the pointer $n$ to be carried into engagement with the indicator $r$ and the shaft 18 moved endwise until the pointer is at the respective notch upon the indicator $r$ corresponding with the hour or period at which it is desired to have the alarm and indicator mechanism operate, as before fully explained. In this way the user is enabled through the medium of the pointer and the indicator to place the proper gear in its proper relative position in respect to the gear P of the time mechanism and then turn the pointer $n$ to the numeral upon the dial $s$ corresponding to the numeral at which the pointer was placed upon the indicator $r$.

While in Fig. 5 we have shown but two wheels 4 and 5, yet it will be readily understood that four wheels may be used, as illustrated in Fig. 15, in which instance the two intermediate wheels 50 and 51 will be provided, respectively, with two and three cams, thus providing four wheels having, respectively, one, two, three, and four cams. In this instance the indicator $r$ will have thereon four notches instead of two, and the user by placing the indicator at the respective notches will be able to have the alarm to alarm one, two, three, or four times during the hour or period indicated by the gears 14 to 17, respectively—that is to say, if the hour-gear 17 is thrown into operation and the wheel 5 thrown into operation then there will be but one alarm every hour. If the second wheel 50 is thrown into operation, it will alarm twice every hour. If the third wheel 51 is thrown into operation, it will alarm three times every hour, and if the fourth wheel is thrown into operation it will alarm four times every hour. In the same way if either of the wheels 14 to 17 is thrown into operation the alarm will be as many times as the number of cams represented upon the respective cam-wheels will divide into the period represented by the respective gears, so that if the gear 14, which indicates four hours, is thrown into operation and the wheel 4, which has four cams, thrown into operation there will be an alarm every hour, and also if the second cam-wheel 50 is thrown into operation and the three-hour gear 15 is thrown into operation there will be an alarm every one-and-a-half hours. From this description it will be seen that through the medium of any desired number of cam-wheels, which may be provided with any desired number of cams, the period of time represented by the gear-wheels 14 to 17 may be divided into any desired number of parts.

By reference to Fig. 15 it will be seen that as the respective cam-wheels there illustrated have different numbers of cams it is not possible to move these cam-wheels endwise in respect to the upturned free end of the arm 6 without carrying the arm 6 out of engagement with the cam-wheels before they are moved. The means for accomplishing this consists in providing the shaft 7 with an L-shaped arm 8, adapted when the shaft is oscillated to engage the free end of the arm 6 and to throw it down and out of engagement with the cam-wheels, when the cam-wheels can be readily moved endwise by the endwise movement of the shaft 7. When the shaft 7 is released, it will be carried to its proper position by gravity or by spring, as may be desired.

For the purpose of enabling the alarm and time mechanism to be used as an ordinary alarm-clock to alarm at any given hour we provide the hour-wheel 41 with an alarm-dial 40, carrying a projecting pin 42. This alarm-dial 40 is adjustable upon the hour-wheel for the purpose of setting it to any desired time, as is well understood by those skilled in the art. A lever 43 (shown in Figs. 4 and 5) is intermediately pivoted at the point $a^2$, Fig. 5, one end of which is adapted to be engaged by the pin 42 of the alarm-dial, and the opposite end 44 is turned inward under the alarm-escape or controlling-arm $c$. When the pin 42 of the alarm-dial 40 depresses the adjacent end of the lever 43, the opposite end 44 of the lever will trip the alarm mechanism by oscillating shaft $d$ and carrying the projections $f$ and $g$ of the escape-lever $c$ out of engagement with the stop-pin $b$ and cause the alarm to be sounded.

For the purpose of muffling the alarm, as may be sometimes necessary in sick-rooms, we provide a muffler push-button 54, which is adapted to be carried in engagement with the bell J for muffling it.

Having thus described our invention, what we claim, and desire to secure by Letters Patent, is—

1. A device of the character described comprising a time mechanism, an alarm mechanism, differential gears, and a movable member adapted to throw said gears respectively into operation with the time mechanism, substantially as described.

2. A device of the character described comprising a time mechanism, a combined alarm and indicator mechanism, the alarm and indicator mechanism including a movable member carrying a plurality of gears of different sizes, and means for throwing the respective gears respectively into operation with the time mechanism, substantially as described.

3. A device of the character described comprising a time mechanism, a combined alarm and indicator mechanism, the latter including a movable member carrying a plurality of gears of different sizes adapted to be respectively thrown into operation with the time mechanism, and also including indicator-operating devices in combination with an indicator adapted to be operated thereby when the alarm is sounded, substantially as described.

4. A device of the character described comprising a time mechanism, an alarm mechanism, an indicator mechanism operated by the said alarm, a movable indicator adapted to be operated by the said indicator mechanism, the alarm mechanism including a movable member carrying a plurality of gears of different sizes adapted to be respectively carried into operation with the time mechanism, substantially as described.

5. A device of the character described comprising a time mechanism, an alarm mechanism, the alarm mechanism comprising a movable member carrying a plurality of transversely-movable gears of various sizes, a member for moving the said gears, and means for moving the gear-carrying member for carrying the gears respectively into operation with the time mechanism, substantially as described.

6. A device of the character described comprising a time mechanism, an alarm mechanism including a swinging frame carrying a shaft, a plurality of gears movable upon the said shaft, the gears being of different sizes, means for moving the gears upon the said shaft, and means for moving the swinging frame for carrying the gears respectively into operation with the time mechanism, substantially as described.

7. A device of the character described comprising a time mechanism, an alarm mechanism, the alarm mechanism including a movable member carrying a plurality of gears adapted to be carried respectively into operation with the time mechanism, the alarm mechanism including also a cam-gear, and an escape-lever controlled by the cam-gear for releasing and stopping the alarm mechanism, substantially as described.

8. A device of the character described comprising a time mechanism, and an alarm mechanism, the latter including movable gears of different sizes adapted to be thrown respectively into operation with the time mechanism, a cam, a lever controlled by said cam, the said lever carrying an arm, the alarm mechanism provided with a stop, adapted to be engaged by the said arm, and a second arm connected with the said stop-arm, and one of the gears of the alarm mechanism provided with a projection or pin for operating the latter arm and in turn controlling the stop-arm, substantially as described.

9. An alarm mechanism comprising a train of gear, a cam-wheel, a rock-shaft carrying two arms, two of the gears of the alarm mechanism provided respectively with pins, one of the arms provided with a stop projection for one of said pins, and the other arm adapted to be engaged by the other pin for operating it and controlling the said stop-arm, substantially as described.

10. An alarm mechanism comprising a train of gear, a cam-wheel, a lever in operative connection with the cam, an oscillating shaft provided with an arm e, one of the gears of the train provided with a pin and projection adapted to operate the arm e, and an arm p carried by the said shaft and having two stop projections, and one of the gears of the alarm mechanism provided with a stop-pin adapted to be engaged by the two said stops of the lever c, substantially as described.

11. A device of the character described comprising a time mechanism, an alarm mechanism, a plurality of laterally and edgewise movable gears of different sizes, and an endwise and rotatable shaft adapted to move the gears laterally by an endwise movement and to move them edgewise by a rotation thereof, substantially as described.

12. A mechanism of the character described comprising a time mechanism, an alarm mechanism including laterally and edgewise movable gears of different sizes adapted to be carried respectively into operation with the time mechanism, an endwise and oscillating shaft adapted to move the gears laterally and to move them edgewise, and indicators for indicating the oscillation and the endwise movement of the said shaft, substantially as described.

13. A mechanism of the character described including a time mechanism, and an alarm mechanism including a plurality of gears of various sizes adapted to be carried into operative connection with the time mechanism, and a plurality of cams having different numbers of cam-surfaces operatively connected with the said plurality of gears, a trip mechanism, actuated by the cam-wheels, and means for moving the cam-wheels, substantially as described.

14. A mechanism of the character described comprising a time mechanism, an alarm mechanism including a plurality of gears of different sizes adapted to be carried into operative connection with the time mechanism, a plurality of cam-wheels operatively connected with the said plurality of gears and actuated thereby and by the time mechanism, a trip mechanism for the alarm mechanism controlled by the said cam-wheels and a sliding rod adapted to move the cam-wheels, substantially as described.

15. A mechanism of the character described comprising a time mechanism, an alarm mechanism including a plurality of gears of different sizes adapted to be carried into operative connection with the time mechanism, a plurality of movable cams operatively connected with the said plurality of gears, the cams having different numbers of cam-surfaces, a trip-lever for the alarm mechanism controlled by the cams, and means for moving the cam-wheels and for throwing the trip-lever out of engagement therewith, substantially as described.

16. A mechanism of the character described comprising a time mechanism, an alarm mechanism, the alarm mechanism including a plurality of gears of different sizes adapted to be carried into operative connection with the time mechanism, a swinging member carrying the said gears, and an oscillating member carrying cams adapted to engage the swinging member for moving the gears into and out of operation with the time mechanism, substantially as described.

17. A mechanism of the character described comprising a time mechanism, an alarm mechanism including a swinging frame carrying a plurality of gears of different sizes adapted to coöperate respectively with the time mechanism, an endwise-movable and oscillating shaft carrying projecting arms adapted to move the gears and carrying cams adapted to engage the swinging frame for moving it and the gears, substantially as described.

18. A medicine-cabinet including a case having a medicine-receptacle, a time mechanism, a combined alarm and indicator mechanism controlled by the time mechanism, and an indicator adjacent the medicine-receptacle actuated and controlled by the indicator mechanism, substantially as described.

19. A medicine-cabinet comprising a case having a medicine-receptacle, a time mechanism, an indicator mechanism controlled by the time mechanism, and means operatively controlled by the time mechanism for indicating the medicine to be taken, substantially as described.

20. A medicine-cabinet comprising a case having a plurality of medicine-receptacles, a time mechanism, an indicator mechanism, and means for indicating the receptacle containing the medicine to be taken, the said indicating means controlled and actuated by the time mechanism, substantially as described.

21. A medicine-cabinet comprising a case having a plurality of medicine-receptacles, a plurality of indicators for said receptacles respectively, a time mechanism, an indicator mechanism independent of said medical receptacles or the contents thereof and controlled and actuated by the time mechanism, and operative connections between the indicator mechanism and the said indicators, substantially as described.

22. A medicine-cabinet comprising a case having a plurality of medicine-receptacles, a plurality of indicators for said receptacles, a time mechanism, an indicator mechanism having an indicator-actuating member, and a plurality of connections for the said indicators, the connections arranged in consecutive relation in the path of the travel of the operating member whereby they are actuated consecutively, substantially as described.

23. A medicine-cabinet comprising a case having in its lower portion a plurality of medicine-receptacles, a time mechanism situated in the upper portion, an indicator mechanism situated adjacent to and controlled and actuated by the time mechanism, and a plurality of indicators situated between the indicator mechanism and the medicine-receptacles, the said indicators operatively connected with and controlled by the indicator mechanism, substantially as described.

24. A medicine-cabinet comprising a case having in one portion thereof a plurality of medicine-receptacles, a plurality of indicator-openings adjacent the said receptacles, a time mechanism, an indicator mechanism controlled and actuated by the time mechanism, a plurality of movable indicators adapted to move across in front of and away from said openings, and operative connections between the indicator mechanism and the indicators for moving them consecutively away from and across the said openings, substantially as described.

In testimony whereof we affix our signatures in presence of two witnesses.

FREDERICK A. LINGER.
JOSEPH A. CARLISLE.

Witnesses:
SAMUEL H. EVANS,
OLIVER P. JOHNSON.